United States Patent

[11] 3,590,147

[72] Inventor Kian Kie Ong
Emmasingel, Eindhoven, Netherlands
[21] Appl. No. 806,928
[22] Filed Mar. 13, 1969
[45] Patented June 29, 1971
[73] Assignee U.S. Philips Corporation
New York, N.Y.
[32] Priority Mar. 26, 1968
[33] Netherlands
[31] 6,804,265

[54] COLOUR KILLER CIRCUIT FOR A COLOUR TELEVISION RECEIVER
6 Claims, 2 Drawing Figs.

[52] U.S. Cl. .......... 178/5.4 CK
[51] Int. Cl. .......... H04n 9/48
[50] Field of Search .......... 178/5.4, 5.4 AC, 5.4 CK

[56] References Cited

UNITED STATES PATENTS

| | | | |
|---|---|---|---|
| 2,961,484 | 11/1960 | Macovski | 178/5.4 |
| 3,308,231 | 3/1967 | Heuer | 178/5.4 |

*Primary Examiner*—Robert L. Richardson
*Attorney*—Frank R. Trifari

ABSTRACT: A circuit for actuating a color killer switch features a gate that passes only the color burst signal. A frequency filter filters the noise components from the gates burst, and then the signal is detected. The noise component of the gated burst signal is also detected. The detected signals are then applied to respectively activate and deactivate the killer switch to insure proper operation of the switch regardless of the signal level.

PATENTED JUN 29 1971 3,590,147

Figure 1:
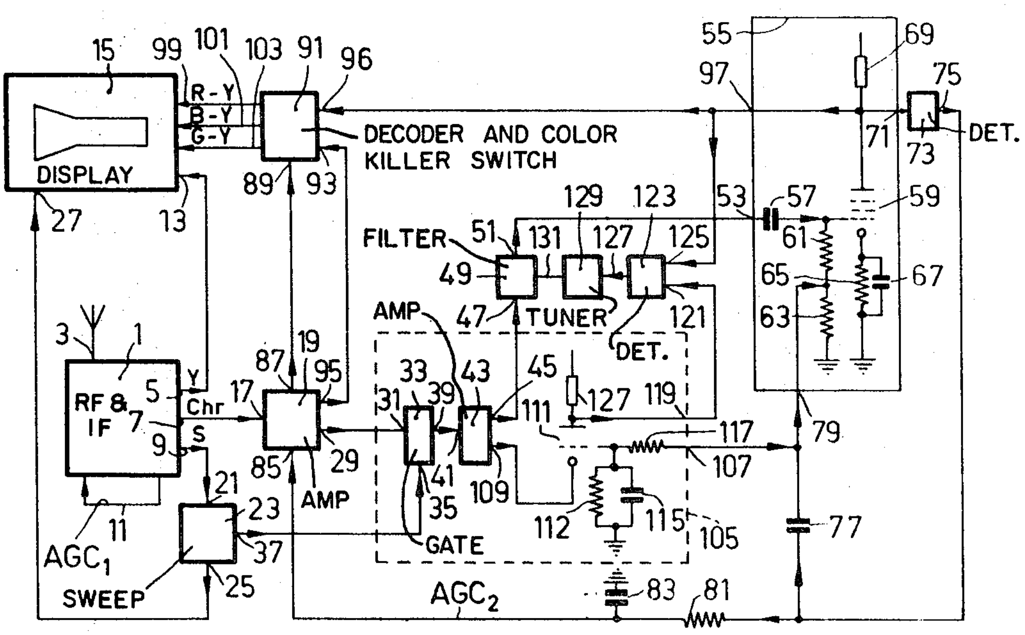

INVENTOR.
KIAN KIE ONG
BY
Frank R. Trifari
AGENT

COLOUR KILLER CIRCUIT FOR A COLOUR TELEVISION RECEIVER

The invention relates to a color signal-handling circuit for a color television receiver having an automatic gain control, comprising a color killer circuit having a color killer switch which can be operated by a control signal, a gate circuit for time selection of the color synchronization signal from a television signal to be handled, a frequency selection circuit connected to an output of the gate circuit for passing the frequency of the color killer information of the color synchronization signal and suppressing frequencies deviating therefrom, a detection circuit connected to an output of the frequency selection circuit and a control signal generating circuit connected to an output of the detection circuit for obtaining the control signal from the frequency-selected and detected color killer information from the color synchronization signal.

A color signal-handling circuit of this type is known from Convention Record of the I.R.E.: part 4, Broadcasting and Television 1953, pp. 9—120 It is stated on page 10, lines 18—22 of this article that the direct voltage at the grid of a limiter tube connected after a crystal filter serving as a frequency selector can be used as a control signal for a color killer switch. It is also stated in this article that such a receiver may comprise an automatic gain control.

The object of a color killer in a color television signal is to enable color reproduction only when a color television signal of sufficient amplitude is received. When a black-and-white signal or a color television signal of insufficient amplitude is received, color reproduction should be impossible. In the known receiver employing a color killer mentioned in the preamble the drawback occurs that the color killer does not always switch off at the same intensity of a received weak color television signal. It is the object of the invention to remove this drawback.

According to the invention, a color signal-handling circuit for a color television receiver of the type mentioned in the preamble is therefore characterized in that for supporting the effect of the control signal the color signal-handling circuit comprises a time selective detection circuit an input of which precedes the frequency selection circuit, which time selective detection circuit is inoperative during the line scan and is operative during at least a part of the line flyback period, said time selective detection circuit comprising an output which is connected to an input of the color killer circuit, at which output the produced voltage influences the said control signal as a function of the voltage presented for detection to the time selective detection circuit, in opposite sense to that of the influence of the voltage produced by the detection circuit connected to the output of the frequency selection circuit as a function of the voltage presented for detection.

The invention is based on the recognition of the fact that in a color television receiver having an automatic gain control which tries to keep constant the picture information signal voltages to be presented for reproduction, the noise voltages which occur in the picture information signals become larger and larger as the amplitude of the received signal becomes smaller. By detecting the said noise voltage according to the invention and influencing the control signal voltage for the color killer circuit in the correct manner by said detected noise voltage, a reliable, very readily reproducible color killing can be obtained.

Figure 2:
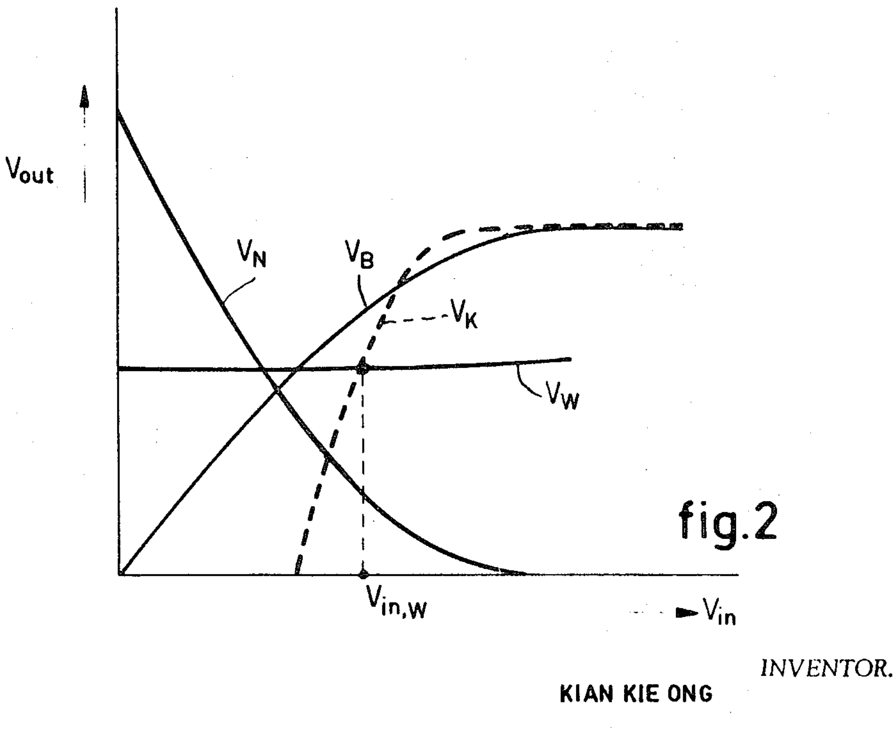

In order that the invention may be readily carried into effect, one embodiment thereof will now be described in greater detail, by way of example, with reference to the accompanying drawing, in which:

FIG. 1 is a simplified block-schematic diagram of a television receiver having a color signal-handling circuit according to the invention; and FIG. 2 shows a few diagrammatic signal-voltage curves to illustrate the operation of the color killer as a result of the measure according to the invention.

In FIG. 1, a part 1 comprises an input 3 to which a received signal can be applied. The part 1 comprises, for example, the conventional HF and IF-amplifying stages and means for separating a color television signal into a luminance signal Y, a chrominance signal Chr and a synchronization signal S. These signals may be derived from a number of outputs 5, 7 and 9, respectively. The part 1 furthermore comprises an automatic gain control $A.G.C_1$ symbolically denoted in the FIG. by the loop 11.

The output 5 of the part 1 is connected to an input 13 of a picture reproducing part 15. The output 7 is connected to an input 17 of an amplifier 19 which constitutes the first part of a color signal-handling circuit. The output 9 is connected to an input 21 of a time base generator 23. An output 25 of said time base generator is connected to an input 27 of the picture-reproducing device 15 for supplying deflection currents thereto.

An output 29 of the amplifier 19 is connected to an input 31 of a gate circuit 33. The gate circuit 33 further comprises an input 35 to which a gating signal can be applied. For that purpose the input 35 is connected to an output 37 of the time base generator 23.

The gate circuit 33 comprises an output 39 which is connected to an input 41 of an amplifier 43. A color synchronization signal which is gated from the color signal by the gate circuit is applied to said input 41. From an output 45 of the amplifier 43 said signal is applied to an input 47 of a frequency selection circuit connected to the output 45.

The frequency selection circuit 49 passes the component of the color subcarrier frequency of the color synchronization signal and suppresses components of other frequencies. For that purpose, for example, a crystal filter may be present in the frequency selection circuit 49. An output 51 of the frequency selection circuit 49 at which the filtered color subcarrier signal appears, is connected to an input 53 of a controllable amplifier 55.

The input 53 is connected to the control grid of a tube 59 through a capacitor 57. Through a series arrangement of resistors 61 and 63 said control grid is connected to ground. The cathode of the tube 59 is connected to ground through a parallel arrangement of a resistor 65 and a capacitor 67. The anode of the tube 59 is connected to a supply voltage through an impedance 69. A filtered color subcarrier signal is obtained from an output 71 connected to the anode impedance 69 and applied to the detection circuit 73 connected to said anode impedance 69. A direct voltage which depends upon the amplitude of the color subcarrier signal at the output 71 appears at an output 75 of said detection circuit. Rapid variations in said direct voltage are transmitted through a capacitor 77, connected to the output 75, to a control input 79 of the controllable amplifier 55. The input 79 is connected to the junction of the resistors 61 and 63. Rapid variations in the color subcarrier voltage at the anode impedance 69 and are therefore counteracted. The output 75 of the detection circuit 73 is connected through a resistor 81 to a capacitor 83 and to a control input 85 of the amplifier 19. The capacitor 83 is connected to ground at its other end and constitutes a low-pass filter with the resistor 81. As a result of this a direct voltage appears at the control input 85 of the amplifier 19 which is a measure of the average amplitude of the color subcarrier signal at the anode impedance 69 of the amplifier 55. By means of this direct voltage, slow variations in the color subcarrier voltage at the anode impedance 69 are counteracted. The direct voltage applied to the control input 85 is moreover amplified by the amplifier 19 and appears at an output 87 thereof as a control signal for a color killer switch. The output 87 is connected to the input 89 of a decoder circuit 91 which also comprises the color killer switch (not shown).

The described circuit from the input 17 of the amplifier 19 to the color killer switch in the decoder circuit 91, forms part of a color killer circuit.

The decoder 91 furthermore comprises an input 93 which is connected to an output 95 of the amplifier 19. As a result of this a color signal to be decoded can be applied to the decoder circuit 91. For decoding, a color subcarrier frequency signal is required which is applied to an input 96. For that purpose the input 95 is connected to an output 97 of the controllable amplifier 55. This output 97 is again connected to the load impedance 69 of the controllable amplifier 55.

The decoder circuit 91 comprises a number of outputs which are connected, through connections 91, 101 and 103 to inputs of the picture-reproducing part 15. Through these connections 99, 101, 103 demodulated color difference signals (R–Y), (B–Y) and (G–Y) obtained from the color signal applied to the input 93, can be applied in the decoder circuit 91 to the picture-reproducing part 15.

The color signal-handling circuit furthermore comprises, according to the invention, a time selective detection circuit 105 having an output 107 which is connected to the input 79 of the color killer. This time selective detection circuit 105 precedes the frequency selection circuit 49. According to a further elaboration of the invention, the gate circuit 33 is used for the time selection in the time selective detection circuit 105. In the time selective detection circuit 105, an output 109 of the amplifier 43 is connected to the cathode of a tube 111. The control grid of said tube 111 is connected to ground through a parallel arrangement of a resistor 112 and a capacitor 115. The cathode control grid electrodes of the tube 111 hence serve as a detector. The control grid of the tube 111 at which a detected voltage is formed, is furthermore connected through a resistor 117 to the output 107 of the time selective detection circuit 105.

The tube 111 further serves as an amplifier for a color synchronization signal gated by the gate circuit 33. The anode of the tube 111 is for that purpose connected to a supply voltage through an impedance 127. A signal amplified by the tube 111 becomes available at an output 119 connected to the impedance 127.

The output 119 is connected to an input 121 of a synchronous detector 123. Another input 125 of the synchronous detector 123 is connected to the output 97 of the controllable amplifier 55. Through this connection a color subcarrier reference signal is applied to the synchronous detector 123. The synchronous detector 123 produces a voltage which is dependent upon the phase relationship between the signals applied to the inputs 121 and 125. This voltage is applied, through a connection 127, to a controllable tuner 129 which is connected to the frequency selection circuit 49, through a connection 131. By means of the controllable tuner 129, which is operated by the output signal of the synchronous detector 122, the frequency selection circuit 49 always remains readily tuned. The phase of the output signal of the frequency selection circuit 119 hence is kept accurately equal to that of the color subcarrier component in the color synchronization signal.

The operation of the color killer, in so far as it is of importance for understanding the invention, will now be described. This description will be made with reference to FIG. 2.

FIG. 2 shows $V_B$ the variation of the amplitude of the color synchronization signal at the output 7 of the part 1 (FIG. 1) as a function of the amplitude of the signal $V_{in}$ applied to the input 3 of the part 1.

$V_N$ the variation of the amplitude of the noise signal at the output 7 of the part 1 as a function of the amplitude of the signal $V_{in}$ applied to the input 3 of the part 1.

$V_K$ the variation of the color subcarrier voltage at the output 71 of the controllable amplifier 55 as a function of the signal $V_{in}$ applied to the input 3 of the part 1.

$V_{W'}$ the value of the signal at the output 71, to which the color killer switch reacts.

The curves shown in FIG. 2 are drawn on an unequal scale so as to illustrate the effect of the measure according to the invention.

FIG. 2 shows that for large signal strengths of the color television signal at the input 3 of the part 1, the amplitude of the noise signal $V_N$ is substantially zero and the amplitude of the color synchronization signal $V_B$ has a constant value as a result of the automatic gain control A.G.C.$_1$ in the part 1. When the amplitude of the input signal at the input 3 decreases, the amplitude of the color synchronization signal $V_B$ begins to decrease below a given value of $V_{in}$. As a result of the action of the control loop AGC$_2$ which extends from the output 29 of the amplifier 19, through the gate circuit 33, the amplifier 43, the frequency selection circuit 49, the controllable amplifier 55, the detection circuit 73 to the input 85 of the amplifier 19, the output signal $V_K$ of the amplifier 55 still remains constant. When the amplitude further decreases, the last-mentioned control loop is no longer operative because the maximum amplification of the amplifier 19 is reached. The voltage $V_K$ then begins to decrease when the input voltage $V_{in}$ further decreases. Approximately simultaneously the noise voltage supplied and detected by the detector circuit grid-cathode junction tube 111, resistor 112 and capacitor 115, begins to increase considerably, so that the amplification of the tube 59 decreases considerably. The tube 59 in the controllable amplifier 55 serves as an amplifier for the color subcarrier voltage filtered from the color synchronization signal. The subcarrier voltage at the anode of the amplifier tube 59 decreases as a result of the reduction of both the amplification and the amplitude of the input signal very rapidly when the color synchronization signal amplitude at the input 17 of the amplifier 19 further decreases.

The subcarrier voltage at the output 71 of the amplifier 55 is detected by the detection circuit 73 and converted, through the amplifier 19 which also serves as a direct voltage amplifier, into a control signal for the color killer switch which becomes available at the output 87 of the amplifier 19. The color killer switch switches at a given value of the supplied control signal and a corresponding value of the signal at the output 71 of the tube 59. This value of the signal is denoted by the line $V_{W'}$ in FIG. 2.

Due to a number of causes, for example, variations in power main voltage or supply voltage, said line $V_W$ may lie slightly higher or slightly lower. Due to the rapid decrease of the color subcarrier signal $V_K$ at the output 71 as a result of the detected noise voltage applied to the input 79 of the amplifier 55, already described above, the curve $V_K$ intersects the line $V_W$ at a large angle which means that with a somewhat higher or lower location of the line $V_{W'}$ the point of intersection shifts very slightly in the direction of the $V_{in}$ axis. This means that the input voltage $V_{in,\ W'}$ at which the color killer switch switches is always substantially the same.

Without the measure of the invention, the curves $V_K$ and the line $V_W$ would intersect each other far less steeply which with a possible shift of $V_W$ would result in a large shift of the point $V_{in,\ W}$ along the $V_{in}$ axis. The input voltage at which the color killer switch would operate, would then be very strongly dependent upon all kinds of other factors.

In the example described, a very economic construction of the color killer according to the invention is given in which substantially only the resistor 117 is incorporated as an extra element for carrying out the measure according to the invention, because in this example the color killer substantially entirely coincides with the control loop AGC$_2$. It will be obvious that this is not necessary. When, for example, the control loop AGC$_2$ would not be present since the junction of the resistor 81 and the capacitor 83 was not connected to the input 85 of the amplifier 19 but, for example, through a separate amplifier or directly to the input 90 of the decoder 91, substantially the same steep variation of the curve $V_K$ would be obtained with a small value of $V_{in}$.

In the example described, two automatic gain control loops AGC$_1$ and AGC$_2$ are shown. As already described the control loop AGC$_2$ is not strictly necessary for the satisfactory operation of the measure according to the invention. The control loop AGC$_1$ is necessary indeed but need not necessarily extend in the way as shown in the Figure. For example, the output voltage of the detection circuit 73 may be used as a control voltage for said loop.

Essential to the measure according to the invention consequently is that a voltage derived from the time-selected and detected noise, which with small amplitudes of the received signal is larger than with large amplitudes, supports the operation of the control signal for a frequency selective color killing active on the color synchronization signal which can be easily realized in various manners according to the invention by those skilled in the art.

The frequency selection of the killer information from the color synchronization signal is carried out in this example by means of a passive integrator at the subcarrier frequency. However, it is possible, as is conventional, for example, in some types of PAL receivers, to carry out the frequency selection of the killer information from the color synchronization signal after a synchronous detection. Actually, the synchronously detected color synchronization signal comprises a component of half the line frequency which can be filtered and detected to obtain a control signal for the color killer.

Furthermore, in the example described, the detected noise voltage is applied to an amplifier stage succeeding the frequency selective detection circuit. It is alternatively possible in principle to support the action of the control signal for the color killer by supplying the detected noise voltage to an amplifier stage preceding the frequency selective detection circuit.

I claim:

1. A control circuit comprising means for receiving a color television signal including automatic gain control means; gate means for selecting the color burst from said television signal; means for frequency filtering said gated burst signal to remove noise; first means for detecting said filtered signal; second means for detecting noise components of said gated burst signal; a color killer circuit; and means for actuating said killer circuit with an increase in the detected noise signal and a decrease in the detected filtered signal.

2. A circuit as claimed in claim 1 further comprising a first amplifier coupled between said filtering and said frequency-detecting means and having a gain control terminal coupled to said noise detecting means.

3. A circuit as claimed in claim 2 wherein said actuating means comprises a second amplifier coupled between said receiving means and said gate, and also being coupled to said killer circuit, and having a control input coupled to said noise detection means.

4. A circuit as claimed in claim 1 wherein said noise detection circuit further comprises a third amplifier.

5. A circuit as claimed in claim 1 wherein said frequency filtering means comprises a passive integrator tuned to the color subcarrier frequency.

6. A circuit as claimed in claim 1 wherein said frequency-filtering means comprises a crystal filter.